J. W. Mahan,
Miter Box,
№ 14,569.      Patented Apr. 1, 1856.
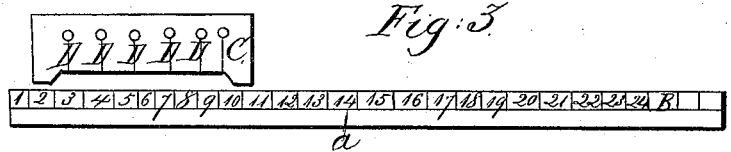
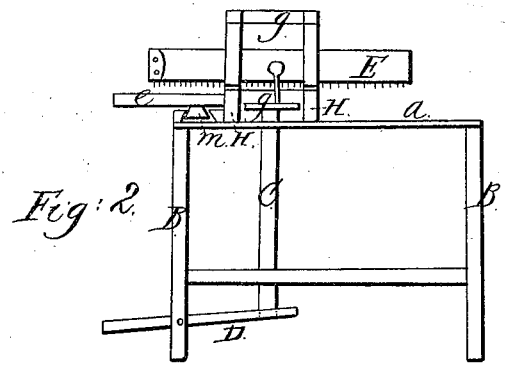
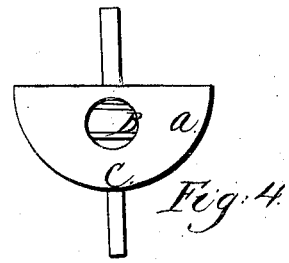
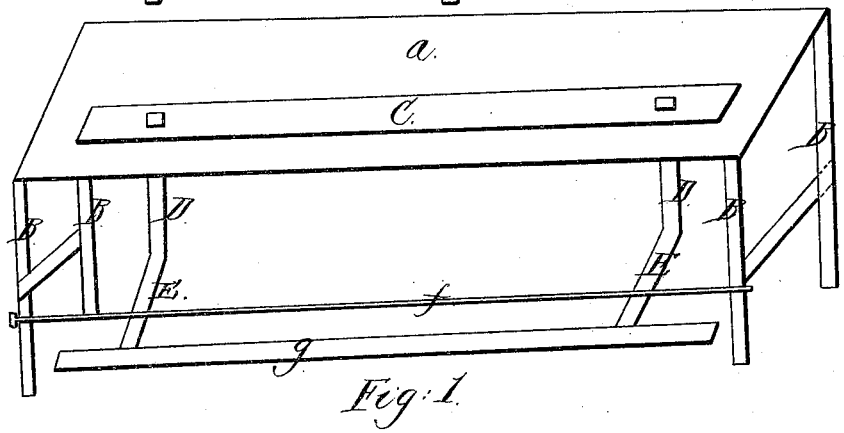
Witnesses:
George Daurcy
L. A. Stephens
Inventor:
J. W. Mahan

UNITED STATES PATENT OFFICE.

J. W. MAHAN, OF LEXINGTON, ILLINOIS.

MITERING-BENCH.

Specification of Letters Patent No. 14,569, dated April 1, 1856.

*To all whom it may concern:*

Be it known that I, J. W. MAHAN, of the town of Lexington, county of McLean and State of Illinois, have invented a new and useful Machine, which I call a "Self-Laying-Off Gain Cutting and Mitering Machine; and I do hereby declare that the following is a full, clear, and exact description of the construction and operation of the same, reference being had to the annexed drawings, they being a part of this specification, in which—

Figure 1 is a perspective view of the bench; Fig. 2, an end view of the same; Fig. 3 is a front view of the laying off and miter box; Fig. 4, a top view of the table disk wheel and chisel.

In Fig. 1, a is the top of the bench; (B B B B), the legs; (c), raising bottom of the laying off box; (D D), the raising arms; (E' E), the treadle levers; (g) the treadle board; (b) an iron rod passing through the front legs of the bench and the treadle levers (E E).

In Fig. 2, (a) is the end of the top of the bench; (B B), the legs; (C), the raising arm;; (D), the treadle lever; (E), the tenon saw; (F), the set screw; (g) the end of the raising board or bottom of the laying off box of the miter box; (l) the disk wheel table; (m) the dovetail to which it is fastened.

In Fig. 3 a is the front side of the laying off box; (B), the scale that determines the length or distance in laying off and sawing material; (c) is the front side of the miter box; (D D D D D) are the spaces or saw cuts in which the tenon saw runs.

In Fig. 4, a is the table of the disk wheel; (B), the disk wheel; (c) the cutting chisel;

Now in order to enable any one to make and use my invention I will proceed to describe the construction and operation of the same.

The first thing is the bench constructed to suit the stuff to be cut. On the top of this bench on the front side is a box constructed into which is placed a bottom made to rise in said box by means of a treadle made to suit. To understand this see Fig. 1 in drawings, also end view drawings, Fig. 2.

On to the top of this box across the end is fastened a bar through which a thumb screw passes to regulate the height of the bottom to be seized in sawing stuff. On top of this box is placed the miter box which is so confined to it that it can be easily moved back or forth the entire length of it in determining the length of stuff to be sawed. In this miter box the saw is stationary or moves back and forth in sawing, neither ascending nor descending, these being mortises cut to fit the back of the saw. In sawing the stuff is fed to the saw by the operator's placing his foot on the treadle and pressing the footboard down in front of this box (the laying off box). A table of convenient size is made with a dovetail on the bottom of it, said table made to move back and forth the entire length of the laying off box, the dove tail of this table working in a groove made in or by I bars of proper size, being fastened on the top of the bench. On to this table which is made of suitable size is placed an iron plate (cast round), it to be securely fastened. On top of this plate is also placed an iron wheel. Through this wheel in the center passes an iron bolt the head being round and countersunk into the wheel. This bolt passes through the iron plate and table and has a nut on the end below. On this iron wheel the cutting chisel is placed, the shaft of it working in 2 square boxes made to fit it perfectly. This chisel can be set to cut at any angle and to be held to its place when set by a tightening screw which passes through the iron wheel down on to the iron plate below; the faces of the laying off box to be faced with cast iron dressed; in splitting the chisel being moved to the place by moving the table on which it rests it is driven through the stuff which in so doing it passes immediately over the edges of the laying off box.

Now what I claim as my invention is—

1. The peculiar construction of the miter box (or its equivalent) as shown by my model, drawings and specification, the advantages it possesses over any other in use being, 1st, so constructed that it never wears out by the teeth of the saw cutting the box, as is the case in ordinary boxes; secondly, its easy combination with the other devices in my machine, for accomplishing the various results which can be accomplished perfectly by any one whether skilled or not in the ordinary way of accomplishing said results, to wit, laying off and cutting picture frames, door and window frames, tenoning sash, &c.

2. What I claim is its combination with the other devices represented substantially shown by my model drawings and specification.

J. W. MAHAN.

Witnesses:
WM. H. SNYDER,
L. A. STEPHENS.